US009841129B2

(12) United States Patent
Gottre et al.

(10) Patent No.: US 9,841,129 B2
(45) Date of Patent: Dec. 12, 2017

(54) FLUID LINE CONNECTION SAFEGUARD

(71) Applicant: Centrotherm Systemtechnik GmbH, Brilon (DE)

(72) Inventors: Alexander Gottre, Petershagen (DE); Ralf Liese, Bestwig (DE)

(73) Assignee: Centrotherm Systemtechnik GmbH, Brilon (DE)

( * ) Notice: Subject to any disclaimer, the term of this patent is extended or adjusted under 35 U.S.C. 154(b) by 0 days.

(21) Appl. No.: 15/281,316

(22) Filed: Sep. 30, 2016

(65) Prior Publication Data
US 2017/0211733 A1    Jul. 27, 2017

(30) Foreign Application Priority Data
Jan. 22, 2016    (DE) .................... 20 2016 100 302 U

(51) Int. Cl.
*F16L 21/00* (2006.01)
*F16L 21/08* (2006.01)

(52) U.S. Cl.
CPC ................................... *F16L 21/08* (2013.01)

(58) Field of Classification Search
CPC ......... F16L 21/06; F16L 21/08; Y10T 24/148; Y10T 24/1461; Y10T 24/1469
USPC ................. 285/313, 414, 415, 400
See application file for complete search history.

(56) References Cited

U.S. PATENT DOCUMENTS

| 244,591 | A | * | 7/1881 | Griffin | F16L 33/02 24/22 |
| 2,455,760 | A | * | 12/1948 | Gustafson | F16L 33/221 24/20 R |
| 3,727,951 | A | * | 4/1973 | Shire | F16L 21/022 285/367 |
| 5,842,725 | A | * | 12/1998 | Allert | F16L 21/06 24/279 |
| 9,033,290 | B2 | * | 5/2015 | Shepard | F16L 3/1025 248/62 |
| 2011/0193341 | A1 | * | 8/2011 | Richter | F16B 2/246 285/313 |

FOREIGN PATENT DOCUMENTS

EP    2354615    8/2011

* cited by examiner

*Primary Examiner* — Aaron Dunwoody
(74) *Attorney, Agent, or Firm* — Rankin, Hill & Clark LLP

(57) ABSTRACT

A fluid line connection safeguard for axial connection of a socket-shaped end portion of a first fluid line part with an end portion of a second fluid line part formed as a spigot end includes an annular clamping body which has a through opening with an overall internal contour and at least two clamping body elements forming a clamping body, wherein a respective clamping body element has a circular segment-shaped internal contour and the circular segment-shaped internal contours of the at least two clamping body elements form the overall internal contour, and wherein the at least two clamping body elements are connected to one another by means of an adjusting connection in such a way that the overall internal contour is adjustable to at least two different diameters.

12 Claims, 4 Drawing Sheets

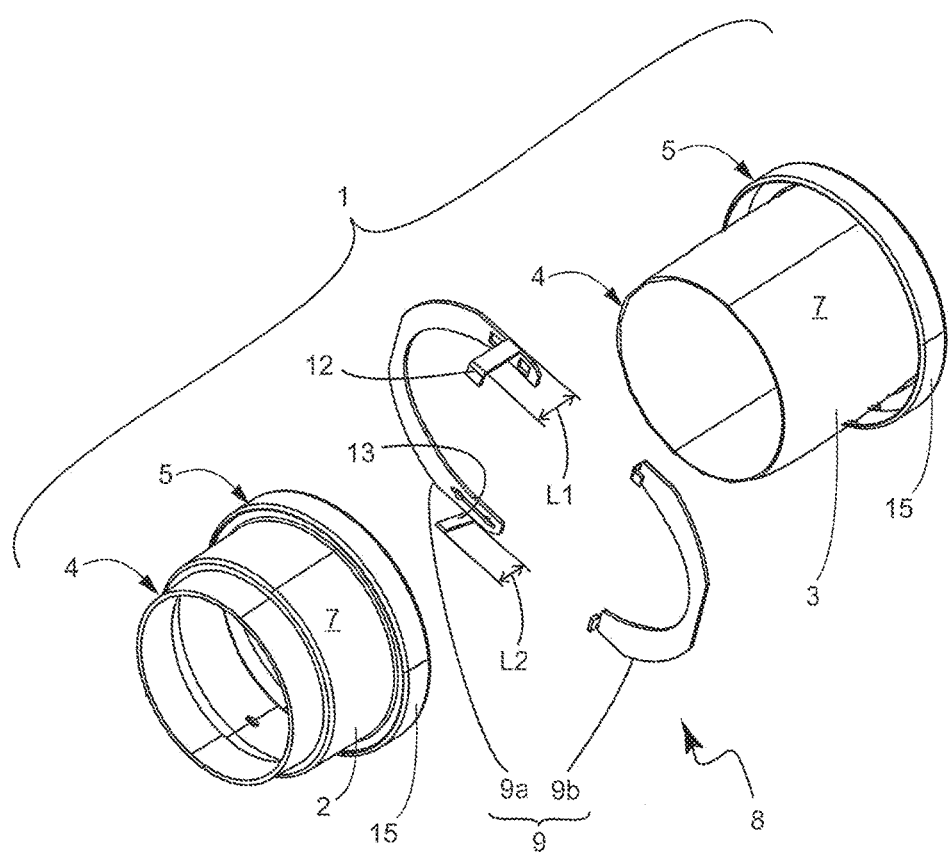
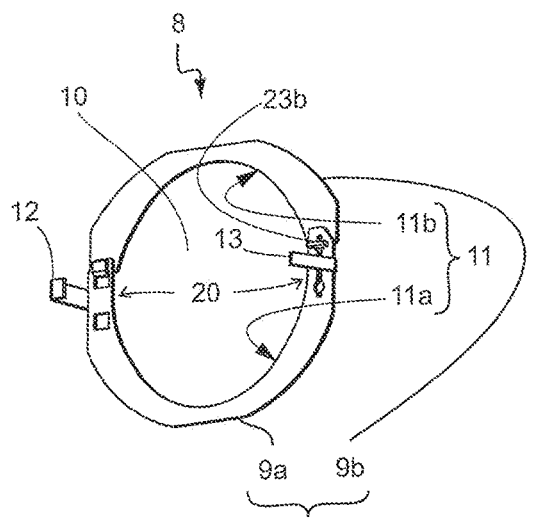 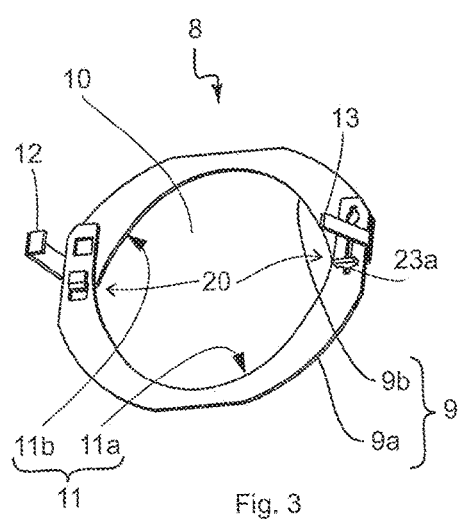
Fig. 1
Fig. 2
Fig. 3

FLUID LINE CONNECTION SAFEGUARD

BACKGROUND AND BRIEF DESCRIPTION

The invention relates to a fluid line connection safeguard for axial connection of a socket-shaped end portion of a first fluid line part with an end portion of a second fluid line part formed as a spigot end, wherein the fluid line connection safeguard comprises an annular clamping body which has a through opening with an overall internal contour adapted to the external diameter of the second fluid line part for insertion of the second fluid line part, wherein at least one hook-shaped retaining element extending in the axial direction for engagement with the end portion of the first fluid line part is formed on the clamping body, wherein at least one stem-like spacer extending in the axial direction is formed on the clamping body, and wherein the at least one retaining element and the at least one spacer extend in the same axial direction.

The invention also relates to a socket connection which has a first fluid line part with a socket-shaped end portion, a second fluid line part with an end portion formed as a spigot end, and a fluid line connection safeguard, wherein the end portion of the second fluid line part formed as a spigot end can be inserted into the socket-shaped end portion of the first fluid line part, and the socket-shaped end portion of the first fluid line part has on its end face at least one collar-like projection formed at least partially on the circumference, wherein the fluid line connection safeguard comprises an annular clamping body with a through opening having an overall internal contour adapted to the external diameter of the second fluid line part for insertion of the second fluid line part, wherein in an assembled arrangement of the socket connection the end portion of the second fluid line part is inserted into the end portion of the first fluid line part and the fluid line connection safeguard is pushed over the outer wall of the second fluid line part and is arranged in the vicinity of the socket-shaped end portion of the first fluid line part, wherein at least one hook-shaped retaining element extending in the axial direction is formed on the annular clamping body for engagement behind the collar-shaped projection formed on the end portion of the first fluid line part, wherein in an assembly position of the socket connection the at least one retaining element engages behind the collar-shaped projection in such a way that the annular clamping body tilts in a deviation from a crooked or oblique position directed perpendicular to the axial direction and bears against the outer wall of the second fluid line part by positive engagement, wherein at least one stem-like spacer extending in the axial direction is formed on the clamping body and, in an assembly position of the socket connection, is supported on the collar-shaped projection of the socket-shaped end portion of the first fluid line part, and wherein the at least one retaining element and the at least one spacer extend in the same axial direction.

In the context of the invention the expression "fluid line part" covers any types of tubular shaped piece or shaped parts in pipelines, such as for example pipes, pipe bends, T-pieces, Y-pieces, coupling sleeves, U-pipes, pipe branches, reductions, pipe stubs and the like. Therefore, statements below relating to pipes, pipelines and pipe joints should not be understood as restricted to pipes but generally to above-mentioned types of fluid line parts and connections thereof. Likewise, in the context of the invention the expression "fluid" covers both gases and also liquids.

It is generally known for end portions of fluid line parts, such as for example pipes, to be connected to one another in order to form a fluid line or pipeline by means of screw, flange, clamp or socket connections.

In the case of screw connections, the end portions of the pipes or fluid line parts have a thread, so that the end portions of the pipes can be securely connected to one another. However, such screw connections restrict the flexibility of laying pipes to a certain extent and, furthermore, require time-consuming fitting operations. Therefore, such screw connections are usually used only in the pipes with small nominal widths, and for nominal pressures up to several hundreds of bars.

In the case of greater nominal widths of the pipe or fluid line parts, flange connections are used in order to connect pipe sections in a sealed but releasable manner. For sealing of the flange connection the contact pressure of the sealing surfaces on the interposed seal is crucial. The contact pressure is generally applied by screws which are inserted through holes in the flange leaves. These flange leaves or flanges are usually welded to the pipe, which entails complex welding work.

In the case of clamp connections, the end portions the pipes or fluid line parts to be connected are completely surrounded by a clamping body. By means of one or more screw connections the clamping body is then tightened and thus clamps the end portions of the pipes to be connected, wherein the region to be clamped comprises almost 360° comprises and the surface pressure between the pipe and the clamping body builds up uniformly. In this case the permissible tightening torque of the screws must be observed in order to achieve the necessary frictional grip between the clamping body and the pipes, so that sealing of the connection is ensured.

Furthermore, socket connections for uninterrupted connection of pipes or fluid line parts are known from the prior art. Such socket connections are used both for substantially pressureless pipelines, such as for example sewer pipes or cable conduits, and also for pressurized pipelines, such as for example conduits for gas, exhaust gas, drinking water or waste water. The socket connection has a socket element which can be produced, for example, by widening of an end portion of a pipe. Alternatively, the socket element can be formed as a separate slip-on socket and can be fitted on the end portion of the pipe. This socket connection is also designated as a so-called push-in socket connection in which a free end portion of a pipe is inserted into the socket element, wherein the free end portion of the pipe is generally designated as a spigot end. For sealing the socket connection, a sealing ring is usually provided, which is inserted in a circumferential groove formed in the inner wall of the socket element.

A disadvantage of these socket connections is that they are not generally self-locking and are not designed to withstand tensile forces, so that there is risk that when tensile loading takes effect the pipes or fluid line parts to be connected slide apart and release the pipe connection or fluid line connection.

In order to prevent this, push-in socket connections are known in which for the purpose of securing the pipe connection before the sealing ring an annular clamping element is arranged in a special recess running all round, and under the action of the recess which narrows towards the socket inlet the clamping element is pressed against the spigot end and, by friction, prevents the spigot end from moving out of the socket. In this case the clamping ring can in particular be roughened or toothed. However, it is a disadvantage that visual checking of the security in the form of the clamping ring is not possible, since the clamping ring is arranged in the interior of the pipe connection between the pipes and checking is only possible when the pipe connection is released.

Furthermore, the use of such a clamping element has the disadvantage that the clamping element does not take effect immediately, but only after a certain run-up distance, so that sealing of the connection is not guaranteed in every case. In addition, such generally elastic clamping elements only withstand a certain tensile force and are not suitable for greater tensile loads. Thus in particular in the case of pressurized socket connections there is a risk that the socket connection is released under tensile loading. Furthermore, in some countries there are strict and mandatory requirements that the socket connection must withstand, for example, a tensile loading of several hundred Newtons as well as a predetermined torque acting on the connection.

These requirements are met by a socket connection of the type designated in the introduction, which is known from EP 2 354 615 B1, which furthermore describes a fluid line connection safeguard of the type designated in the introduction which withstands high tensile forces. However, this fluid line connection safeguard has the disadvantage that it is designed only for a single nominal width of the fluid line part and thus can only be used for an application with a specific nominal width.

The object of the invention is to create a solution which, in a structurally simple and cost-effective manner, provides a simplified and improved safeguard for axial connection of end portions of fluid line parts, which furthermore can be easily fitted and disengaged, is effective immediately after application and can be used for different nominal widths.

In the case of a fluid line connection safeguard and a socket connection of the type designated in the introduction this object is achieved according to the invention in that at least two clamping body elements form the clamping body, wherein a respective clamping body element has a circular segment-shaped internal contour and the circular segment-shaped internal contour of the at least two clamping body elements form the overall internal contour, and wherein the at least two clamping body elements should be connected to one another by means of an adjusting connection in such a way that the overall internal contour is adjustable to at least two different diameters.

Advantages and expedient embodiments and modifications of the invention are disclosed by the corresponding sub-claims.

The invention provides a possibility by which an increase in the tensile strength for fluid line connections such as, for example, pipe joints, like a push-in socket connection, is achieved in a structurally simple manner. The fluid line connection safeguard serves for quick connection of end portions of fluid line parts, such as for example pipes. With the aid of the fluid line connection safeguard according to the invention it is now possible to produce not only a tension-resistant fluid line connection or pipe connection, but also to release it again in a simple manner. Because at least two clamping body elements form the clamping body and are connected to one another by means of an adjusting connection, it is possible to use the fluid line connection safeguard not only for connection of a specific nominal width, but also to use the fluid line connection safeguard for another application with another nominal width. Furthermore, the resulting flexibility for use of the fluid line connection safeguard is reflected in a reduction in the production and purchase costs, as it is no longer necessary to purchase a specific fluid line connection safeguard for a specific nominal width. Instead, the fluid line connection safeguard according to the invention covers at least two nominal widths. In this case it is not necessary to align the spacer and the retaining element strictly parallel to one another. Furthermore, due to the oblique position of the fluid line connection safeguard in the fitted state or in the assembled arrangement, a slight clamping or pre-clamping of the clamping body on the second fluid line part is achieved. This clamping causes the fluid line connection safeguard to tilt further in the event of any sliding apart of the fluid line connection and thus ultimately a type of self-locking occurs. The fitting of the fluid line connection safeguard or the socket connection can take place quickly by hand without the use of a tool. Furthermore, the fluid line connection is not subject to any influence by a technician or workman. Since the connection according to the invention does not use any screws, flanges, clips or the like, there is also no need to pay attention to tightening torques of the screws. Checking whether the fluid line connection is properly set up and the fitting of the fluid line connection safeguard has taken place correctly can be carried out by means of simple visual inspection.

In a modification of the fluid line connection safeguard according to the invention the axial length or extent of the at least one hook-shaped retaining element is greater than the axial length or extent of the at least one stem-like spacer. These measure additionally supports the clamping or tilting of the fluid line connection safeguard on the second fluid line part, wherein the spacer in the installation position of the fluid line connection safeguard is supported on the projection of the end portion of the first fluid line part, whereas the hook-shaped retaining element engages behind a projection formed on the end portion of the first fluid line part. This is the same projection which runs all round circumferentially on the socket-shaped end portion of the fluid line part. However, it is also conceivable that two projections on the socket-shaped end portion are formed on parts of the circumference of the end portion and the arrangement thereof corresponds to the arrangement of the retaining element and the spacer.

In an embodiment of the fluid line connection safeguard according to the invention it is particularly advantageous if the clamping body is formed by a first clamping body element and a second clamping body element which are in each case circular segment-shaped, wherein at least two insertion recesses are formed on a first circular segment end of the first clamping body element, wherein an adjustment slot is formed on a second circular segment end of the first clamping body element, wherein a retaining hook, which in the assembled state of the clamping body engages in one of the at least two insertion recesses of the first clamping body element, is formed on a first circular segment end of the second clamping body element, and wherein on a second circular segment end of the second clamping body a T-shaped adjustment means is formed, which in the assembled state of the clamping body protrudes into the adjustment slot and is fixed against movement at one of two end regions of the adjustment slot. Consequently, the adjusting connection is formed by the insertion recesses, of which one co-operates with the retaining hook, and one of the end regions of the adjustment slot in which the adjustment means is fixed. Because the retaining hook engages in one of the insertion recesses and the adjustment means is fixed in one of the end regions of the adjustment slot a purely mechanical connection is produced, which functions without screws or other aids, in order to produce a secure and reliable connection, so that no tool has to be used for fitting the two clamping body elements, which significantly simplifies the fitting.

In a further embodiment of the fluid line connection safeguard according to the invention the width of the adjustment slot is smaller than the width of the stem of the T-shaped adjustment means leading to the top member, wherein the depth of the stem of the T-shaped adjustment means leading to the top member corresponds substantially to the width of the adjustment slot, wherein the two end regions of the adjustment slot are larger than the width of the stem of the T-shaped adjustment means leading to the top member, and wherein the second clamping body element is rotatable relative to the first clamping body element when the stem of the T-shaped adjustment means leading to the top member is arranged inside one of the two end regions of the adjustment slot. Due to this configuration the adjustment means can be fixed to the first clamping body element in a defined manner only in the end regions, whereas the adjustment slot allows a movement of the adjustment means from end region to end region, but fixing of the adjustment means along the adjustment slot is not possible.

With regard to cost-effective manufacture of the fluid line connection safeguard it is advantageous in one embodiment of the invention if the at least one retaining element and the at least one spacer are formed on the first clamping body element.

In order to ensure the stability of the assembled clamping body elements, in a further embodiment according to the invention the at least one retaining element is formed on the first circular segment end of the first clamping body element. The at least one retaining element is preferably arranged between the at least two insertion recesses.

In addition to ensuring the stability of the assembled clamping bodies, in a further embodiment the at least one spacer is formed on the second circular segment end of the first clamping body element. Here too it is preferred that the at least one spacer is arranged between the two end regions of the adjustment slot.

For reasons of the stability of the fluid line connection safeguard, in one embodiment according to the invention in the assembled clamping body the T-shaped adjustment means and the retaining hook of the second clamping body element point in the same axially direction as the at least one retaining element and the at least one spacer which are formed on the first clamping body element.

In order to increase the clamping action of the fluid line connection safeguard on the outer circumference of the second fluid line part, it is advantageous that the clamping body—in particular in the assembly position of the socket connection—is arranged with a certain pre-clamping effect on the second fluid line part. In addition to this certain pre-clamping, according to one embodiment of the invention the internal contour of the through opening of the clamping body is sharp-edged or is formed as a friction surface, in order to increase the clamping or tilting of the fluid line connection safeguard on the outer wall of the fluid line part. For example, in the case of a metal construction of the fluid line connection safeguard the sharp-edged internal contour of the clamping body can easily cut into the outer wall of a fluid line part made, for example, of plastic, which additionally increases the clamping action.

Furthermore, according to an embodiment of the invention the axial width of the projection is greater than the amount of the difference between the axial lengths of the at least one retaining element and the at least one spacer. This results in a controlled oblique positioning and certain pre-clamping or tilting of the fluid line connection safeguard on the outer wall of the fluid line part.

In a modification according to the invention the at least one spacer is formed substantially on the side of the clamping body radially opposite the at least one retaining element. However, it is also conceivable to arrange the spacer at a different position and/or to provide a plurality of spacers. These different embodiments ensure that the fluid line connection safeguard in its installation position or in the assembled arrangement of the fluid line connection is arranged slightly tilted on the second fluid line part and bears closely against the outer wall of the second fluid line part.

Finally, in an embodiment of the invention, in the assembled arrangement of the socket connection the fluid line connection safeguard is tilted at an angle between 5° and 10° with respect to the axis extending perpendicular to the axial direction of the socket connection. with the second fluid line part on its outer wall. This angular range ensures a sufficient clamping action in order to prevent the fluid line parts from sliding apart. However, it is also conceivable that an angle of less than 5° as well as an angle of more than 10° can be used, which for example depends, amongst other things, upon the diameter of the fluid line parts to be connected.

It will be understood that the features referred to above and still to be explained below can be used not only in the respective combination stated but also in other combinations or by themselves without departing from the scope of the present invention. The scope of the invention is defined only by the claims.

Further details, features and advantages of the invention are apparent from the following description in connection with the drawings, in which a preferred exemplary embodiment of the invention is illustrated by way of example.

BRIEF DESCRIPTION OF THE DRAWINGS

FIG. 1 shows an individual partial representation of a socket connection in perspective view, FIG. 2 shows a fluid line connection safeguard for a first nominal width, FIG. 3 shows a fluid line connection safeguard for a second nominal width.

DETAILED DESCRIPTION

Figure 4:
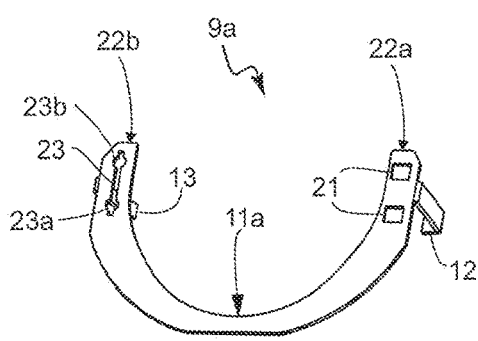
FIG. 4 shows a first clamping body element of a clamping body of the fluid line connection safeguard according to the invention.
Figure 5:
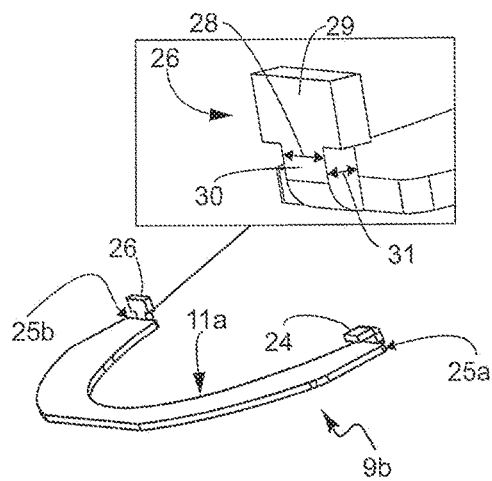
FIG. 5 shows a second clamping body element of the clamping body of the fluid line connection safeguard according to the invention with a detail view.

In the specific exemplary embodiment of the present invention a pipe connection is described below. It will be understood that the invention is not limited only to such a pipe connection and a fluid line connection safeguard which fixes this pipe connection, but connections of any fluid line parts or shaped parts/shaped pieces, such as for example pipes, pipe bends, T-pieces, Y-pieces, coupling sleeves, U-pipe, pipe branches, reductions, pipe stubs and the like, are covered.

FIGS. 1 and 9 to 11 show a pipe connection or pipe connection arrangement designated overall by 1, which constitutes the socket connection 1 according to the invention. The socket connection 1 or pipe connection 1 comprises a first pipe or fluid line part 2 and a second pipe or fluid line part 3, which in the illustrated exemplary embodiment are both of circular cylindrical construction and are made of plastic. Consideration may be given, for example, to polypropylene as a material for the pipes, wherein a mineral filler (for example, glass fibers) can be worked into the material. However, it is also conceivable that the pipes are made of acrylonitrile-butadiene-styrene (ABS), which is a material with a high surface hardness and good impact strength.

The two pipes 2 and 3 are shaped at their respective end portions 4 and 5 in such a way that they can be connected to one another in the manner of a socket or push-in socket connection. For the connection the end portion 4 of the second pipe 3 is inserted into the end portion 5 of the first pipe 2, so that the socket connection is achieved. By virtue of their construction the first pipe 2 and the second pipe 3 are formed identically, so that the following statements relating to the first pipe 2 also apply without restriction to the second pipe 3 and vice versa, i.e. statements relating to the second pipe 3 also apply without restriction to the first pipe 2. The person skilled in the art will recognize that an identical construction of the pipes is not absolutely necessary for implementation of the invention. On the contrary, the pipe-pipe connection described below serves merely to illustrate the invention by way of example, so that a connection of a pipe to, for example, a T-piece is conceivable, i.e. a connection of different fluid line parts or shaped pieces.

In order to achieve the socket connection, both the first pipe 2 and also the second pipe 3 in each case have a first end portion 4 which is formed as a spigot end. A second end portion 5 of the pipes 2 and 3 is located opposite the first end portion 4 and is formed as a socket, which can take place, for example, in the context of the production process by widening of the second end portion 5. Alternatively, it is also conceivable that on the second end portion 5 a socket element is fitted onto the respective pipe 2 and 3 and is fixed there.

The sealing between the first pipe 2 and the second pipe 3 is provided by a sealing element which is not shown in greater detail in the drawings and which is inlaid into a circumferential or annular bead in the end portion 5 formed as a socket. After the insertion of the second pipe 3 into the first pipe 2, the sealing element, which is elastic, is laid with deformation so as to form a seal, on the one hand, onto the end portion 4 of the inserted pipe 3 formed as a spigot end or onto of the outer wall 7 thereof and, on the other hand, is pressed into the circumferential or annular bead formed in the end portion 5 formed as a socket. An 0 ring, a lip seal, a T-shaped profile seal or the like, which is inserted into the internally extending groove or annular bead formed in the socket-shaped end portion 5, can serve as the elastic sealing element and, during insertion of the spigot end 4 of the pipe 3 to be connected, comes to bear against the outer wall 7 of said pipe and is compressed there.

The socket-shaped end portion 5 of the respective pipes 2 and 3 also has a projection 15 which is formed on the end face and located radially externally on the outer wall 7 and which in the illustrated exemplary embodiment is in the form of a collar extending all around the circumference.

In order to ensure a tension-resistant axial connection of the first and second pipes 2, 3, according to the invention a fluid line connection safeguard 8 is provided, so that the pipe connection 1 cannot pull apart automatically in the event of tensile loading in the manner of a socket connection. The fluid line connection safeguard 8 illustrated in FIGS. 1 to 3 and 9 to 12 is shown in detail in FIGS. 2 to 8. In the illustrated exemplary embodiment, the fluid line connection safeguard 8 comprises a first clamping body element 9a and a second clamping body element 9b, which are connected to one another by means of an adjusting connection 20 and form an annular or ring-like embodied clamping body 9 with a through opening 10. In this case the clamping body 9 can also be formed of more than two clamping body elements, wherein a two-part construction has proved particularly advantageous. Also it is not necessary for the clamping body 9 formed by the first and second clamping body elements 9a, 9b to be annular. For it to function what is important is merely the through opening 10 which is adapted to the external diameter of the pipes 2 and 3 whose diameter must be insignificantly or slightly greater than the external diameter of the pipes 2 and 3. For example, in a pipe of 80 mm diameter the internal diameter of the through opening 10 would be approximately 80.5 mm if a tolerance of approximately 0.4 mm in the pipe diameter were taken into consideration. Accordingly, the internal diameter of the through opening is greater than the external diameter of the pipe 2 and 3 by 0.1% to 0.5%.

By the two-part embodiment of the clamping body 9 the fluid line connection safeguard 8 according to the invention enables an adjustability of the clamping body 9 to different diameters, as can be seen with reference to FIGS. 2 and 3. By means of the adjusting connection 20, the through opening 10—starting from FIG. 2—can be adapted by corresponding adjustment to a smaller through opening 10, as shown in FIG. 3, in order to ensure a pipe connection to pipes with a correspondingly smaller nominal width. Consequently, due to the adjusting connection 20 it is possible to change the through opening 10, which has an overall internal contour 11 adapted to the external diameter of the two pipes 2 and 3 with an internal diameter which is greater by 0.1% to 0.5% by comparison with the external diameter of the pipes 2 and 3 for insertion of one of the pipes. It may be remarked that, in pipes having a diameter greater than 80 mm, the above-mentioned value of 0.1% is not reached and crucially is dependent upon the system variable, i.e. the pipe diameter. The form of the through opening 10 as well as the overall internal contour 11 of the clamping body 9 is therefore dimensioned so that the internal diameter of the through opening 10 is slightly greater than the external diameter of the pipes 2 and 3. This makes it possible that for installation of the fluid line connection safeguard 8 the second pipe 3 can still be inserted without appreciable frictional resistance into the through opening 10 or that for installation the fluid line connection safeguard 8 can be pushed over the outer wall 7 of the pipe 3.

In this case the overall internal contour 11 is formed by a circular segment-shaped internal contour 11a of the first clamping body element 9a and a circular segment-shaped internal contour 11b of the second clamping body element 9b (see for example FIGS. 2 and 3). The two clamping body elements 9a and 9b are also in each case circular segment-shaped or crescent-shaped, wherein other shapes are also conceivable so long as respective circular segment-shaped internal contours 11a, 11b are provided.

The adjusting connection 20, by which the overall internal contour 11 in the illustrated exemplary embodiment is adjustable to two different diameters, is formed both on the first clamping body element 9a and also on the second clamping body element 9b and is shown in detail in FIGS. 4 to 8. The adjusting connection 20 comprises two insertion recesses 21 which are formed on a first circular segment end 22a of the first clamping body element 9a, an adjustment slot 23 which has two opposing end regions 23a, 23b and is formed on a second circular segment end 22b of the first clamping body element 9a, a retaining hook 24, which is formed on a first circular segment end 25a of the second clamping body element 9b, and a T-shaped adjustment means 26 which is formed on a second circular segment end 25b of the second clamping body 9. With the clamping body 9 assembled, the retaining hook 24 engages in one of the at least two insertion recess 20 of the first clamping body element 9a (see for example FIG. 2), whereas the T-shaped adjustment means 26 is arranged protruding into the adjustment slot 23 and is fixed against movement on one of the two end regions 23a or 23b of the adjustment slot 23. In FIG. 2 the adjustment means 26 is arranged in the end region 23a, whereas in FIG. 3 the adjustment means 26 is arranged in the end region 23b.

Figure 6:
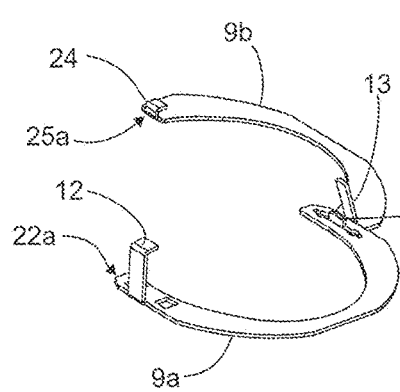
FIG. 6 shows the first and second clamping bodies during assembly, with a detail view.
Figure 6:
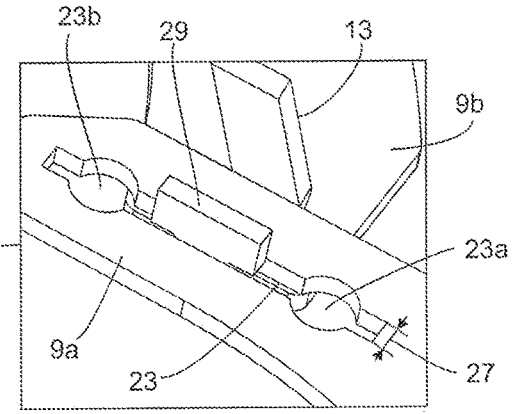
Figure 7:
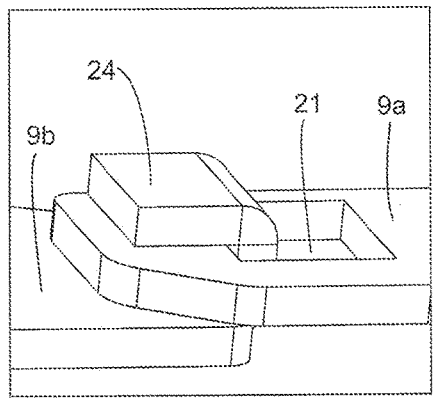
FIG. 7 shows a detail view for a connection of the first and second clamping bodies at one of their circular segment ends.
Figure 8:
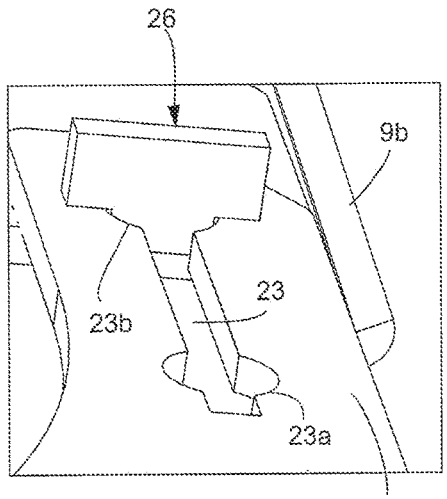
FIG. 8 shows a detail view for a connection of the first and second clamping bodies at their other circular segment ends.

In order that the adjustment means 26 can be fixed in one of the two end regions 23a, the width 27 of the adjustment slot 23 is designed to be smaller than the width 28 of the stem 30 of the T-shaped adjustment means 26 leading to the top member 29. Due to this configuration the adjustment means 26 can be fixed in one of the two end regions 23a, 23b and cannot move into the adjustment slot 23. However, for fitting and removal of the two clamping body elements 9a and 9b the adjustment means 26 must be movable out of the associated end region 23a, 23b, which can be achieved by a relative rotation of the clamping body elements 9a, 9b relative to one another, as indicated in FIG. 6. For this purpose, the depth 31 of the stem 30 of the T-shaped adjustment means 26 leading to the top member 29 corresponds substantially to the width 27 of the adjustment slot 23, so that the stem 30 is rotatable in both end regions 23a, 23b in order to align the top member 29 with the adjustment slot 23, as is shown in FIG. 6. Furthermore, the two end regions 23a and 23b of the adjustment slot 23 are larger than the width 28 of the stem 30 of the T-shaped adjustment means 26 leading to the top member 29. In this case the position of the two clamping body elements 9a and 9b illustrated in FIG. 6 correspond to a position in which the clamping body elements 9a, 9b are connected to one another or are disengaged from one another or the through opening 10 is changed by moving the adjustment means 26 to the other end region 23a or 23b and fixing it there and by additionally engaging the retaining hook 24 in another insertion recess 21, as shown in FIG. 7. The second clamping body element 9b is rotatable relative to the first clamping body element 9a when the stem 30 of the T-shaped adjustment means 26 leading to the top member 29 is arranged inside one of the two end regions 23a, 23b of the adjustment slot 23.

Consequently, for assembly of the clamping body 9 first of all the T-shaped adjustment means 26 protrudes through the adjustment slot 23, until the two clamping body elements 9a and 9b rest on one another, as shown in FIG. 6. Then the adjustment means 26 can be moved in the adjustment slot 23 to a required one of the two end regions 23a or 23b, where a relative rotation of the two clamping body elements 9a, 9b relative to one another is then possible. In this case the clamping body elements 9a and 9b are rotated out of the position shown in FIG. 6 in such a way that the first circular segment end 22a of the first clamping body 9a moves towards the first circular segment end 25a of the second clamping body 9b until the retaining hook 24 can engage in the insertion recess 21 corresponding to the end region 23a or 23b. After the retaining hook 24 is brought into engagement the adjusting connection 20 is produced, so that the arrangements of the components described above are taken up on the first and second circular segment ends 22a, 22b, 25a, 25b shown in FIGS. 7 and 8.

Furthermore, the clamping body 9 assembled from the two clamping body elements 9a and 9b in the manner described above comprises an axial retaining element or retaining element 12, which in the illustrated exemplary embodiment is formed on the first clamping body element 9a. The retaining element 12 is formed like a hook, i.e. it has a stem portion which extends in the axial direction of the pipes 2 or 3 and is adjoined by a portion angled relative to this stem portion. A spacer 13 likewise formed on the first clamping body element 9a is formed on the side of the clamping body 9 opposite the retaining element 12 when viewed radially, said spacer being in the form of a bar and extending in the axial direction like the retaining element 12. As can be seen in the drawings, the retaining element 12 and the spacer 13 extend in the same axial direction. As can also be seen from FIG. 1, the axial length or extent L1 of the hook-shaped retaining element 12 is greater than the axial length or extent L2 of the stem-like spacer 13. The illustrated embodiment of the fluid line connection safeguard 8 is made of a metallic material, wherein the internal contour 11 of the through opening 10 has a sharp edge.

Figure 9:
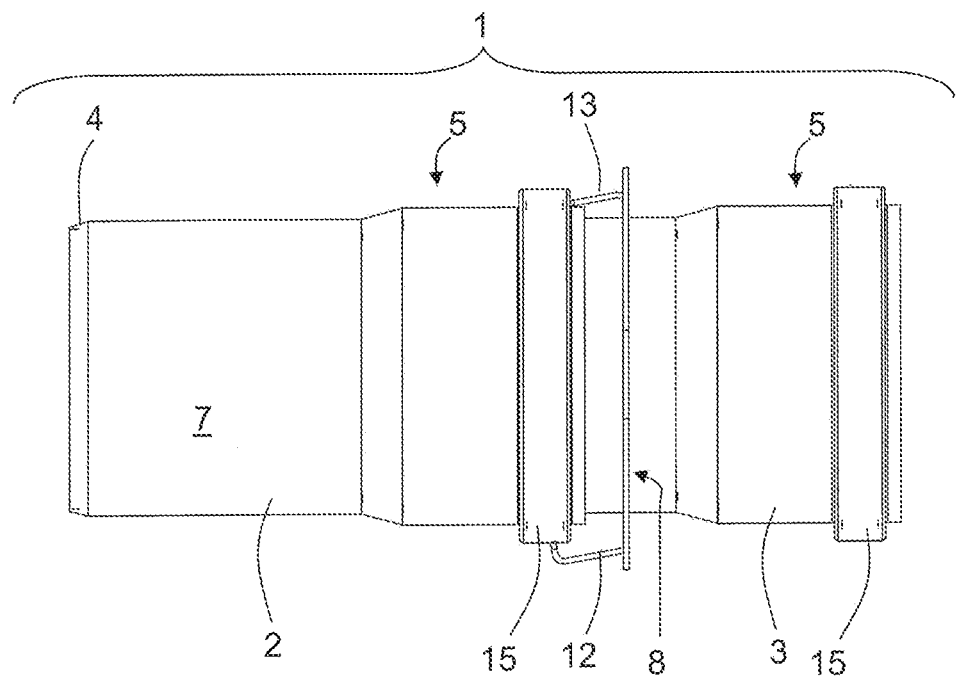
FIG. 9 shows the socket connection according to the invention before the arrangement of the fluid line connection safeguard in its installation position.
Figure 10:
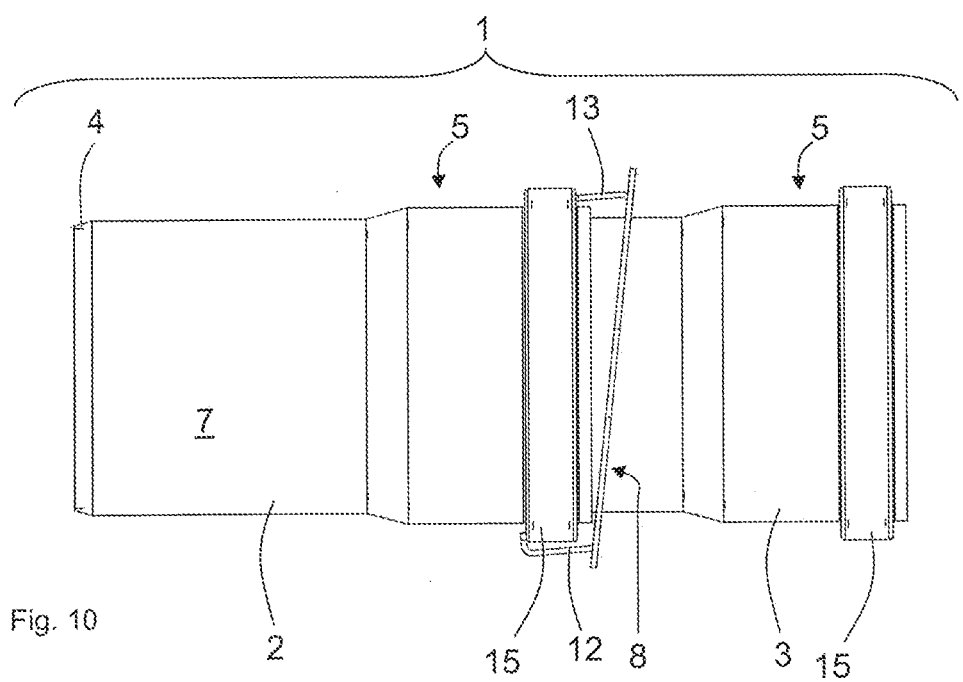
FIG. 10 shows the socket connection according to the invention in its assembly arrangement.
Figure 11:
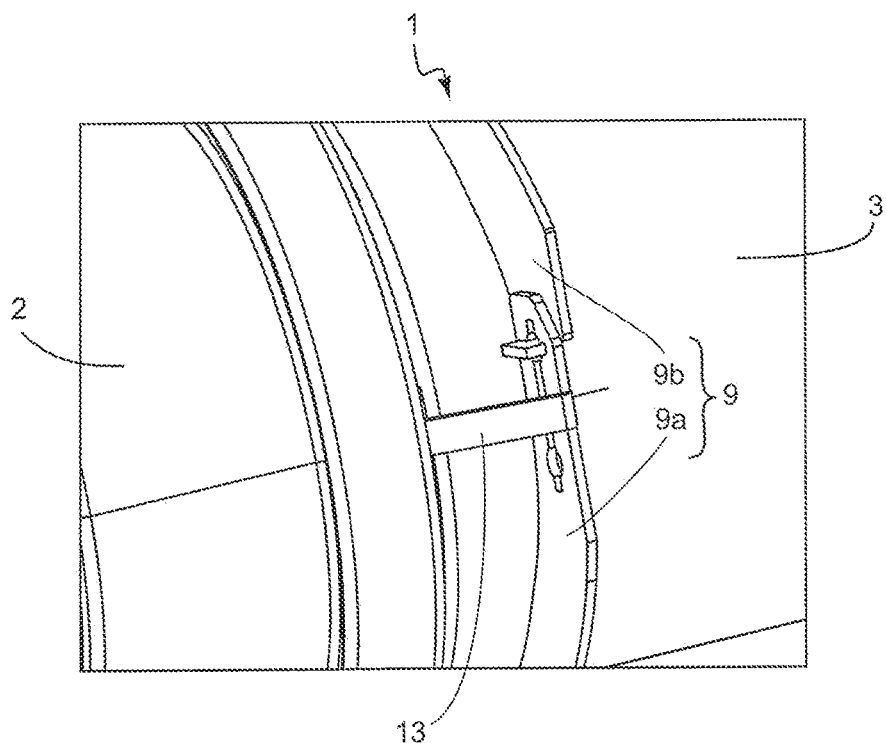
FIG. 11 shows the socket connection according to the invention in the assembly position in a perspective view.
Figure 12:
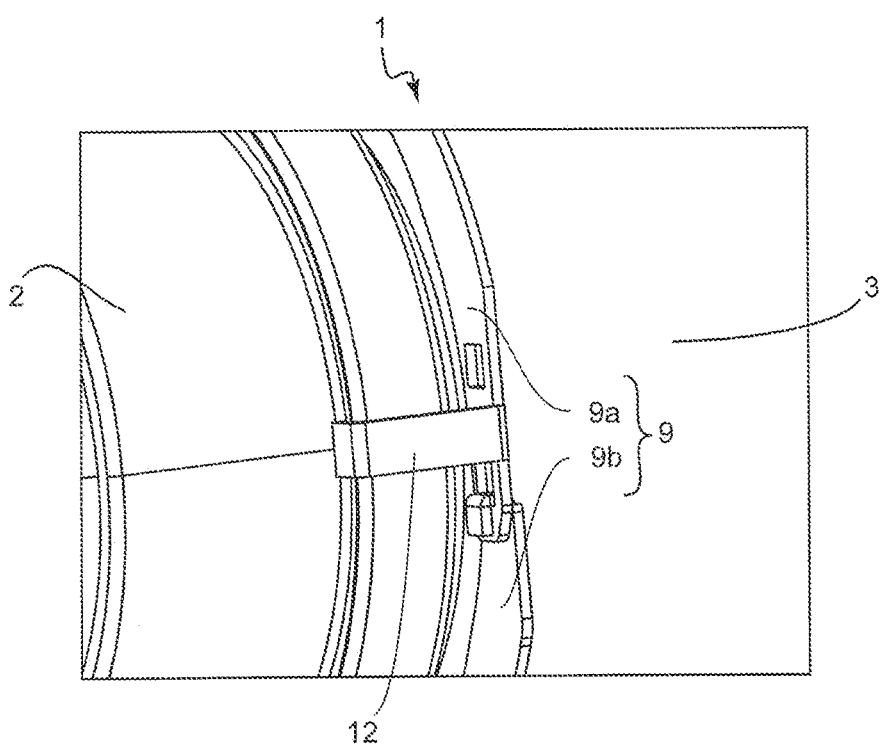
FIG. 12 shows the socket connection according to the invention in the assembly position in a perspective view which differs from FIG. 11.

The fitting of the socket connection 1 according to the invention is explained in greater detail below with reference to FIGS. 1 and 9 to 12. Before the second pipe 3 with the end portion 4 formed as a spigot end is inserted into the socket-shaped end portion 5 of the first pipe 2, the clamping body 9 assembled from the two clamping body elements 9a, 9b is pushed forward with the end portion 4 over the outer wall 7 of the second pipe 3. Then the end portion 4 of the second pipe is inserted into the socket-shaped end portion 5 of the first pipe 2. Following this—as can be seen in FIG. 9—the fluid line connection safeguard 8 is moved and pushed on the second pipe 3 in the direction of the end portion 5 of the first pipe 2 until the spacer 13 of the fluid line connection safeguard 8 is supported on the projection 15 of the first pipe 2 formed like a collar on the end face of the end portion 5. Thus the stem-like spacer 13 is located on the end face of the projection 15 of the first pipe 2. During the displacement movement of the fluid line connection safeguard 8 on the outer wall 7 of the second pipe 3, the fluid line connection safeguard 8 assumes a substantially vertical position with respect to the axial direction of the pipe 3, so that as a result of the slightly greater internal diameter of the through opening 10 the fluid line connection safeguard 8 can be displaced without significant resistance on the outer wall 7 of the second pipe 3. In order to safeguard the socket connection 1, i.e. the connection of the first pipe 2 and the second pipe 3, the hook-shaped retaining element 12 of the fluid line connection safeguard 8 is pushed over the projection 15 of the first pipe 2 and engages behind the projection 15. This corresponds to the assembly position illustrated in FIG. 10, in which the fluid line connection safeguard 8 is now no longer arranged perpendicular to the axial direction of the pipes on the outer wall 7 of the second pipe 3, but is tilted crookedly or obliquely on the second pipe 3, so that the internal contour 11 of the through opening 10 of the fluid line connection safeguard 8 bears closely and in positive engagement against the outer wall 7 of the second pipe 3 without a gap. The axial width of the projection 15 and the axial lengths L1 and L2 of the hook-shaped retaining element 12 or of the spacer 13 are dimensioned in such a way that, in an assembled arrangement of the pipe connection or fluid line connection 1, the fluid line connection safeguard 8 is arranged tilted at an angle of approximately 9° with respect to the axis extending perpendicular to the pipe axis or is clamped on the outer wall 7 of the second pipe 3. An angle of less than 10° is usually preferred, and the angle is usually between 5° and 10°. In this case the axial width of the projection 15 is greater than the amount of the difference between the axial lengths or extents L1 and L2. In the assembly position the retaining element 12 engages behind the projection 15, wherein the spacer 13 ensures a pre-clamping of the fluid line connection safeguard 8 on the outer wall 7 of the second pipe 3. If a tensile force should now act on the pipe connection 1, the two pipes 2 and 3 would attempt to move away from one another. Because of the pre-clamping of the internal contour 10 on the outer wall 7 of the second pipe 3, during such a movement the fluid line connection safeguard 8 can only move away from the first pipe 2 on the side of the spacer 13, but this leads to an enlargement of the clamping angle and thus to an increase in the jamming or tilting on the second pipe 3 and thus prevents a movement of the second pipe 3. In this case the construction of the internal contour 11 of the through opening 10 is important, so that it does not allow any sliding of the second pipe 3 out of the through opening 10. Therefore, the internal contour is either sharp-edged or formed as a friction surface.

It is not essential for the projection 15 of the socket-shaped end section 5 to be formed as a collar running around the circumference. As an alternative it is conceivable that the end portion 5 has two projections which are formed on radially opposing sides of the end portion 5 and are arranged corresponding to the arrangement of the retaining element 12 and spacer 13. In this case it is merely important that the spacer can be supported on the first pipe 2 and that the retaining element 12 can be brought into engagement with the first pipe 2 in order to prevent the two pipes 2 and 3 from sliding apart.

Due to the oblique position of the fluid line connection safeguard 8 in the fitted state or in the assembly position of the pipe connection 1, tilting of the internal contour 11 of the clamping body 9 on the second pipe 3 is achieved, i.e. the fluid line connection safeguard 8 experiences a certain pre-clamping so long as no tensile force acts on the pipe connection 1. This pre-clamping causes the fluid line connection safeguard 8 to tilt further in the event of any sliding apart of the pipe connection 1 and thus ultimately a type of self-locking occurs which produces a friction-induced resistance against slipping or twisting of the outer wall 7 of the second pipe 3 bearing against the internal contour 11. This self-locking is influenced by the angle of clamping or twisting, the surface roughness of the internal contour 11 and the material combination of fluid line connection safeguard 8 and pipe 3.

The pipes 2 and 3 are usually plastic pipes, so that, in the event of a sharp-edged construction of the internal contour 11 of the through opening 10, the fluid line connection safeguard 8 easily cuts into the plastic material of the pipes 2 and 3 during clamping and thus the clamping action is increased. This applies in the case of a metal construction of the fluid line connection safeguard 8.

The invention described above makes it possible for an axial tension-resistant pipe connection to be made quickly by hand without the use of a tool. In this type of pipe connection, the technician has no influence on the functionality of the pipe connection, since no tensioning screws, clips and the like have to be tightened. Furthermore, the pipe connection according to the invention enables simple visual checking of the correct fitting of the fluid line connection safeguard.

The invention claimed is:

1. A fluid line connection safeguard for axial connection of a socket-shaped end portion of a first fluid line part with an end portion of a second fluid line part formed as a spigot end,
   wherein the fluid line connection safeguard comprises an annular clamping body which has a through opening with an overall internal contour adapted to an external diameter of the second fluid line part for insertion of the second fluid line part,
   wherein at least one hook-shaped retaining element extending in an axial direction for engagement with the end portion of the first fluid line part is formed on the clamping body,
   wherein at least one spacer extending in the axial direction is formed on the clamping body,
   and wherein the at least one retaining element and the at least one spacer extend in the same axial direction,
   wherein at least two clamping body elements form the clamping body,
   wherein a respective clamping body element has a circular segment-shaped internal contour and the circular segment-shaped internal contours of the at least two clamping body elements form the overall internal contour, and
   wherein the at least two clamping body elements are connected to one another by means of an adjusting connection in such a way that the overall internal contour is adjustable to at least two different diameters,
   wherein the clamping body is formed by a first clamping body element and a second clamping body element which are in each case circular segment-shaped,
   wherein at least two insertion recesses are formed on a first circular segment end of the first clamping body element,
   wherein an adjustment slot is formed on a second circular segment end of the first clamping body element,
   wherein a retaining hook, which in an assembled state of the clamping body engages in one of the at least two insertion recesses of the first clamping body element, is formed on a first circular segment end of the second clamping body element,
   and wherein on a second circular segment end of the second clamping body a T-shaped adjustment means is formed, which in an assembled state of the clamping body protrudes into the adjustment slot and is fixed against movement at one of two end regions of the adjustment slot.

2. The fluid line connection safeguard according to claim 1, wherein an axial length of the at least one hook-shaped retaining element is greater than an axial length of the at least one spacer.

3. The fluid line connection safeguard according to claim 1, wherein an width of the adjustment slot is designed to be smaller than an width of a stem of the T-shaped adjustment means leading to a top member, wherein the width of the stem of the T-shaped adjustment means leading to the top member corresponds substantially to the width of the adjustment slot, wherein the two end regions of the adjustment slot are larger than the width of the stem of the T-shaped adjustment means leading to the top member, and wherein the second clamping body element is rotatable relative to the first clamping body element when the stem of the T-shaped adjustment means leading to the top member is arranged inside one of the two end regions of the adjustment slot.

4. The fluid line connection safeguard according to claim 1, wherein the at least one retaining element and the at least one spacer are formed on the first clamping body element.

5. The fluid line connection safeguard according to claim 4, wherein the at least one retaining element is formed on the first circular segment end of the first clamping body element.

6. The fluid line connection safeguard according to claim 4, wherein the at least one spacer is formed on the second circular segment end of the first clamping body element.

7. The fluid line connection safeguard according to claim 1, wherein in an assembled clamping body the T-shaped adjustment means and the retaining hook of the second clamping body element point in the same axially direction as the at least one retaining element and the at least one spacer.

8. The fluid line connection safeguard according to claim 1, wherein the overall internal contour of the through opening is sharp-edged or is formed as a friction surface.

9. A socket connection which has a first fluid line part with a socket-shaped end portion, a second fluid line part with an end portion formed as a spigot end, and a fluid line connection safeguard, wherein the end portion of the second fluid line part formed as a spigot end can be inserted into the socket-shaped end portion of the first fluid line part, and the socket-shaped end portion of the first fluid line part has an end face with at least one projection formed at least partially on a circumference, wherein the fluid line connection safeguard comprises an annular clamping body with a through opening which has an overall internal contour adapted to an external diameter of the second fluid line part for insertion of the second fluid line part, wherein in an assembled arrangement of the socket connection the end portion of the second fluid line part is inserted into the end portion of the first fluid line part and the fluid line connection safeguard is pushed over an outer wall of the second fluid line part and is arranged in the vicinity of the socket-shaped end portion of the first fluid line part, wherein at least one hook-shaped retaining element extending in an axial direction is formed on the annular clamping body for engagement behind a collar-shaped projection formed on the end portion of the first fluid line part, wherein in an assembly position of the socket connection the at least one retaining element engages behind the collar-shaped projection in such a way that the annular clamping body tilts in a deviation from a crooked or oblique position directed perpendicular to the axial direction and bears against the outer wall of the second fluid line part in positive engagement, wherein at least one spacer extending in the axial direction is formed on the clamping body and, in an assembly position of the socket connection, is supported on the collar-shaped projection of the socket-shaped end portion of the first fluid line part, and wherein the at least one retaining element and the at least one spacer extend in the same axial direction, wherein at least two clamping body elements form the clamping body, wherein a respective clamping body has a circular segment-shaped internal contour and the circular segment-shaped internal contours of the at least two clamping bodies form the overall internal contour, and wherein the at least two clamping bodies are connected to one another by means of an adjusting connection in such a way that the overall internal contour is adjustable to at least two different diameters, wherein the clamping body is formed by a first clamping body element and a second clamping body element which are in each case circular segment-shaped, wherein at least two insertion recesses are formed on a first circular segment end of the first clamping body element, wherein an adjustment slot is formed on a second circular segment end of the first clamping body element, wherein a retaining hook, which in an assembled state of the clamping body engages in one of the at least two insertion recesses of the first clamping body element, is formed on a first circular segment end of the second clamping body element, and wherein on a second circular segment end of the second clamping body a T-shaped adjustment means is formed, which in the assembled state of the clamping body protrudes into the adjustment slot and is fixed against movement at one of two end regions of the adjustment slot.

10. The socket connection according to claim 9, wherein the axial width of the collar-shaped projection is greater than the amount of the difference between an axial length of the at least one retaining element and an axial length of the at least one spacer.

11. The socket connection according to claim 9, wherein the at least one spacer is formed substantially on the side of the clamping body radially opposite the at least one retaining element.

12. The socket connection according to claim 9, wherein in the assembled arrangement of the socket connection the fluid line connection safeguard is tilted at an angle between 5° and 10° with respect to the axis extending perpendicular to the axial direction of the socket connection, with the second fluid line part on its outer wall.

* * * * *